United States Patent [19]
Wells et al.

[11] Patent Number: 5,457,784
[45] Date of Patent: Oct. 10, 1995

[54] INTERFACING SYSTEM USING AN AUTO-ADAPTING MULTI-PORTED CONTROL MODULE BETWEEN AN I/O PORT AND A PLURALITY OF PERIPHERAL ADAPTORS VIA BUS EXTENDING CABLES

[75] Inventors: Michael F. Wells, Poway; John L. Kolb, Ramona; Jayanta Maitra, San Diego, all of Calif.

[73] Assignee: Metacomp, Inc., San Diego, Calif.

[21] Appl. No.: 846,180

[22] Filed: Mar. 5, 1992

[51] Int. Cl.⁶ .................... G06F 5/01; G06F 13/12; G06F 13/36; G06F 13/20
[52] U.S. Cl. .................. 395/829; 395/500; 364/710.14; 364/221.1; 364/221.8; 364/222.2; 364/231.5; 364/232.3; 364/234.4; 364/DIG. 1; 364/238.2; 364/238.5; 364/238.6; 364/239.2; 364/239.51; 364/240.1; 364/240.8; 364/260.1; 364/919.5; 364/927.81; 364/927.95; 364/927.99; 364/935.3; 364/935.44; 364/939.81
[58] Field of Search ..................... 395/275, 325, 395/200, 800, 500; 364/200, 710.14; 380/3; 341/89, 100, 144

[56] References Cited

U.S. PATENT DOCUMENTS

| | | | |
|---|---|---|---|
| 3,711,843 | 1/1973 | Galuagni et al. | 360/43 |
| 4,363,094 | 12/1982 | Kaul et al. | 395/325 |
| 4,500,933 | 2/1985 | Chan | 360/69 |
| 4,592,320 | 6/1986 | Peter et al. | 132/339 |
| 4,603,320 | 7/1986 | Farago | 361/394 |
| 4,686,506 | 8/1987 | Farago | 361/394 |
| 4,825,402 | 4/1989 | Jalali | 364/900 |
| 4,899,306 | 2/1990 | Greer | 364/900 |
| 4,972,470 | 11/1990 | Farago | 380/3 |
| 5,161,222 | 11/1992 | Montejo et al. | 395/500 |
| 5,289,580 | 2/1994 | Latif et al. | 395/275 |
| 5,327,428 | 9/1994 | Van As et al. | 370/94.2 |

Primary Examiner—Thomas C. Lee
Assistant Examiner—Felicia Ives
Attorney, Agent, or Firm—Henri J. A. Charmasson; John D. Buchaca

[57] ABSTRACT

A self-adapting interface assembly on a data processor allows communication with a variety of other data processing devices operating under different communication protocols. The assembly comprises an input and output signal translating module installed between the data processor input/output port and a cable terminated by simple adaptor modules for coupling to various types of data processing devices. The adaptor can sense the type of device and send to the translating module an identifying bit stream. The translating module uses the device identification to programmatically change the configuration of data receivers and drivers and control signal buffers in order to assure exchange of data between the data processor and the device connected to the adaptor module regardless of their respective electrical interface characteristics.

16 Claims, 4 Drawing Sheets

INTERFACING SYSTEM USING AN AUTO-ADAPTING MULTI-PORTED CONTROL MODULE BETWEEN AN I/O PORT AND A PLURALITY OF PERIPHERAL ADAPTORS VIA BUS EXTENDING CABLES

FIELD OF THE INVENTION

This invention relates to data processor interfaces, and more particularly to communication ports with other data processing devices.

BACKGROUND OF THE INVENTION

Communication between data processing devices can currently be done in accordance with one of a variety of interface standards such as RS-232, RS-422, RS-423, RS-449, RS-485, V.35, MIL-188-114A, and EIA-530. Each of these interface standards defines a particular protocol for exchange of control signals between the device, and specific signal levels and waveforms. Each of these interface standards was developed to address unique requirements in specific applications or wide areas of data communications. Due to the large number of interface standards in use at the present time, compatibility between data processing equipment modules is not always possible, or can only be done through the use of cumbersome intermediary adaptor units.

Data processors are often used in association with a variety of communication networks. The physical interface to be used to connect to a particular network is dependent upon the application, the nature of available interconnection equipment, the data rate etc., and often varies from one application to the next. This presents to the users, two different problems. First, is the need to easily determine the interface standard of the other devices in the network. Secondly, the users must find a way to adapt his machine to that standard. Ideally, this adaptation should be accomplished without having to resort to the rewiring of interface or the setting of jumper connections or switches, and other procedures prone to human errors.

The current solutions either offer a limited versatility, or are very costly, cumbersome and tedious to implement. Some data processors are provided with an hybrid serial port which can accommodate two different interface standards such as RS-232 and subset of RS-422 or RS-423. Some serial ports offer multiple interface which can be implemented by the rewiring of jumpers on an input/output control board. Some users resort to the use of external converter boxes dedicated to the translation of signals between devices using two specific interface standards. A separate and different converter box must be used when interfacing with another device using a different interface standard.

U.S. Pat. No. 4,972,470, Farago suggests a more flexible solution to multiple standard interfacing problems by offering a interface module that can be programmed by the host computer to assume one of a variety of interface standard configurations. While this approach may simplify the resolution of the second problem, i.e. reconfiguration of the interface, it does not relieve the user from the often difficult task of determining in which type of interface standard his machine must be reconfigured, then, once this has been determined, of triggering the interface reconfiguration process. It would be more advantageous and far more practical to have an input/output port that can adapt itself to a variety of communication protocols without requiring operator intervention.

SUMMARY OF THE INVENTION

The principal and secondary objects of this invention are to provide a simple and self-implementing means for adapting the communication port of a data processor to either one of a variety of interface standards by automatically sensing the interface standard requirement of another device to which it is connected, then programmatically reconfiguring itself to allow communication with that device, and with other devices of different interface standards.

These and other objects are achieved by a input and output signal translating module connected between an input/output port of the host device and a cable terminated by a simple adaptor module for coupling with various types of data processing devices. The adaptor can sense the type of data processing device connected to it and send to the translating module an identifying bit stream. The translating module uses the identifying bit stream to programmatically change the configuration of the data receiver and drivers, control signal buffers and other parameters to the standard required by the connected device.

DESCRIPTION OF THE PREFERRED EMBODIMENTS OF THE INVENTION

Figure 1:
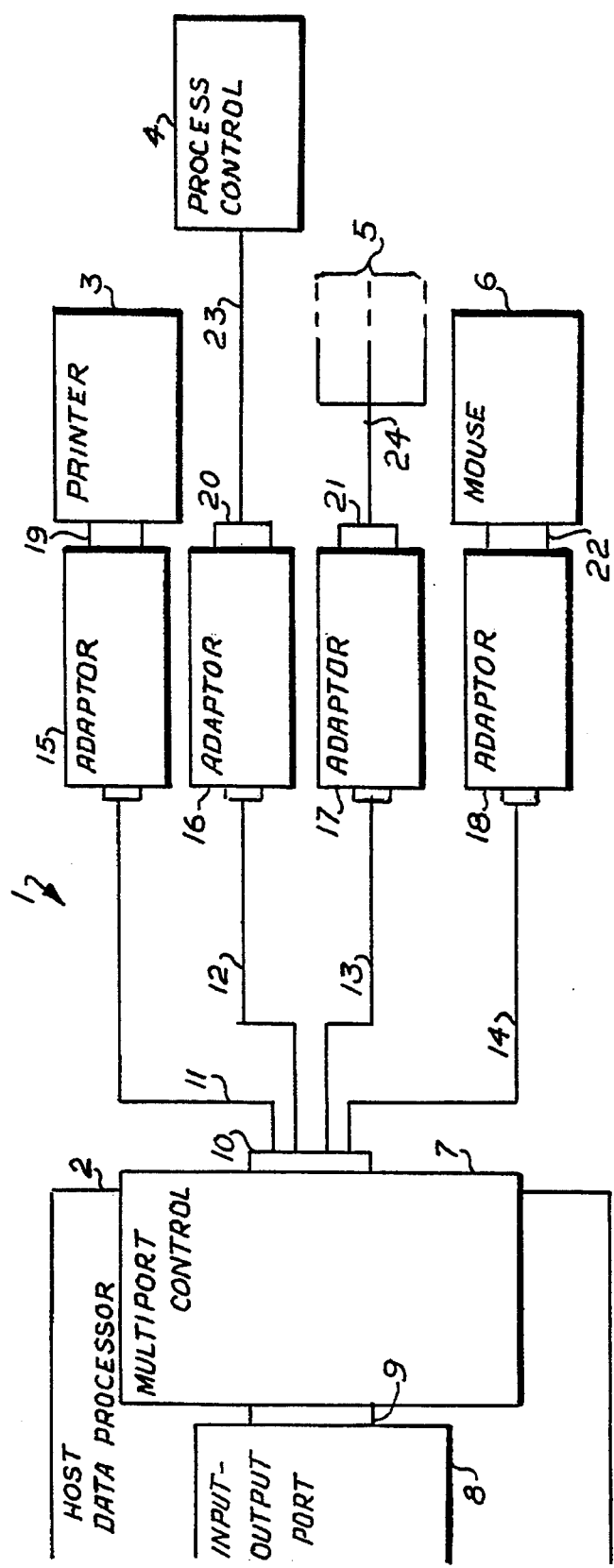
FIG. 1 is a general block diagram of the multi-interface port system.

Referring now to the drawing, there is shown in FIG. 1 the general block diagram of a multi-interface port system 1 used in connection with a host data processor 2 to communicate with four separate data processing devices or installations 3, 4, 5, and 6 which may have the same or different input/output electrical interface standards. For the sake of illustration, the first peripheral device 3 is a printer that is addressed through a RS-232 serial input port. The second peripheral device 4 is an industrial process control system which can be addressed through an V.35 serial input port. The third peripheral device 5 is a network of a variety of data processing units which are linked together through their respective RS-485 serial input/output ports. The fourth peripheral device 6 is a mouse with a RS-232 serial interface.

The multi-interface port system 1 comprises a multiport control module 7 which is preferably housed in the enclosure of the host data processor 2. Typically, the multiport control module 7 is a plug-in printed circuit board which is connected to the a serial input/output port 8 of the host data processor through a motherboard connector 9. A serial input/output port with standard TTL interface is perferred over a direct interface with the host data processor bus. Such an input/output port assembly can be currently obtained from METACOMP, INC. of San Diego, Calif. The multiport control module interface with the various peripheral devices is carried through a 100-pin connector 10. The plug-in half of the multiport connector is wired to four separate 25-conductor cables 11, 12, 13, and 14. At the other end of each cable is an adaptor module 15, 16, 17, and 18 which carries an appropriate pin connector 19, 20, 21, and 22 for interface with the corresponding peripheral device. The first and last adaptor modules 15 and 18 are plugged directly into the printer and mouse serial interface respectively. The second and third adaptors are connected to the industrial process control 4 and data processing network 5 by means of appropriate cables 23 and 24.

As will be explained in more detail below, each adaptor has electronic circuitry capable of identifying the type of peripheral device to which it is connected. The multiport control module 7 has electronic circuitry which allows it to interrogate each adaptor module in order to determine what type of electrical interface standard must be used to communicate with each one of the peripheral devices. Accordingly, upon initialization of the host data processor 2 or on command, the multiport control module acquires sequentially from the adaptor modules a series of codes indicative of the type of peripheral devices to which those modules are connected, then programs a separate port conditioner module to handle signals to and from each of the adaptor modules.

Figure 2:
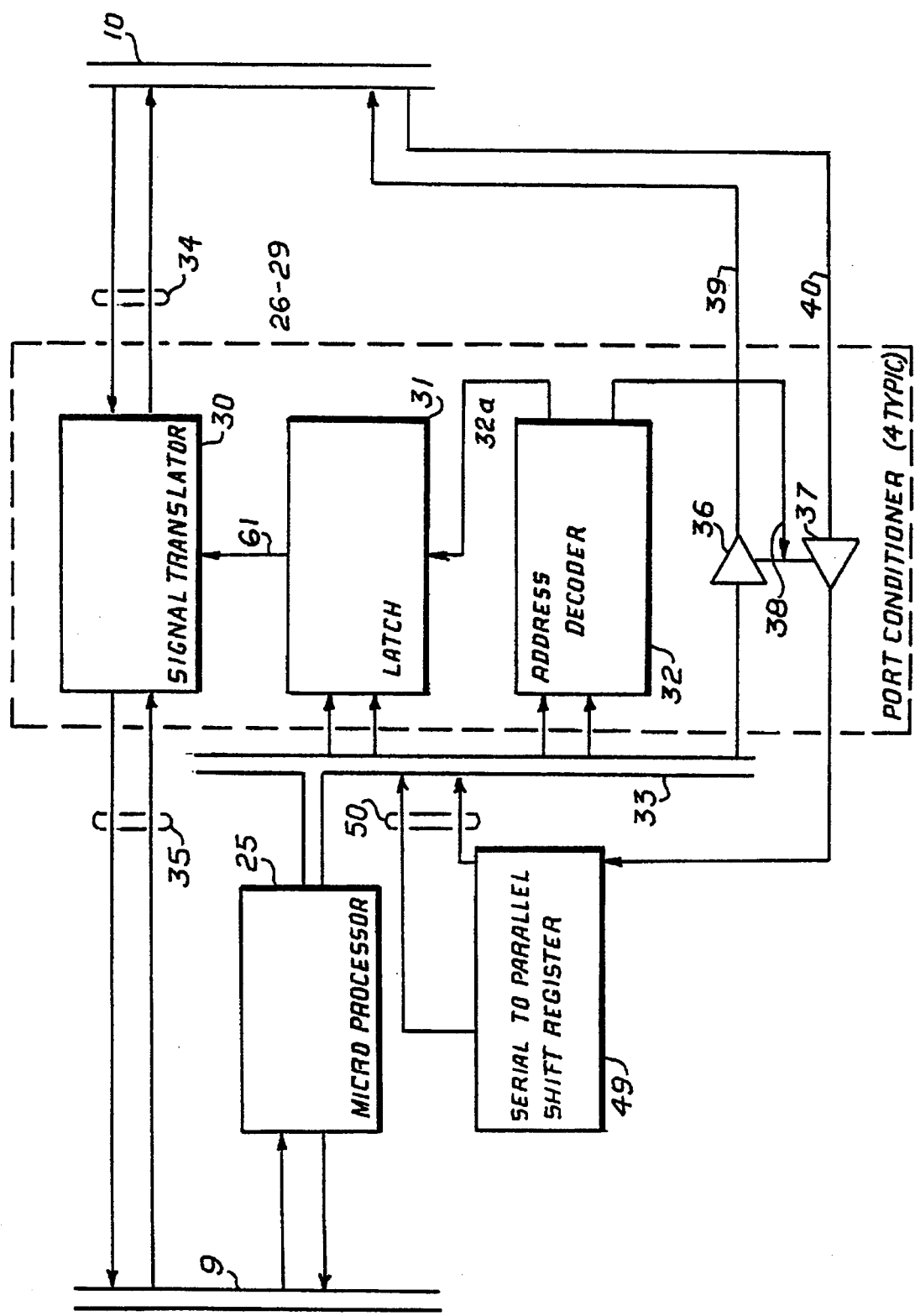
FIG. 2 is a block diagram of the multiport control module.

The basic structure of the multiport control module 7 is illustrated in FIG. 2, and consists essentially of a microprocessor 25 and four typical port conditioner modules 26–29 only a typical one is shown in Figure. Each port conditioner module comprises a set 30 of signal translators for the input and output lines of the corresponding adaptor module and peripheral device shown in FIG. 1. The signal translators can be placed into a particular configuration and held there by a latch memory circuit 31 that is driven by the micro-processor 25 through the micro-processor bus 33. An address decoder 32 associated with each port conditioner module enables the latch 31 via line 32a and the signal translators 30 when that particular port conditioner module address is recognized on the micro-processor bus 33. Each set 30 of signal translators communicates with the multiport connector 10 through a first series of input/output lines 34, and to the host data processor input/output port 8 shown in FIG. 1 via connector 9 through a second series of input/output lines 35. Depending upon the type of electrical interface standard used by the host data processor input/output port 8 shown in FIG. 1 and the applicable peripheral device 3–6, the two series of input/output lines 35, 34 may differ in terms of voltage level, type of signal such as unipolar or bipolar, single-ended or differential, input or output impedance characteristic etc.

Each port conditioner module 26–29 also includes a gated driver 36 for the clock signal 39 used to interrogate the adaptor module, and a gated receiver 37 to carry a bit stream signal 40 identifying the type of peripheral device attached to the corresponding adaptor module. These gated drivers and receivers are enabled by the address decoder 32 via a control lines 38 when the particular port conditioner module is being addressed by the micro-processor 25.

Figure 3:
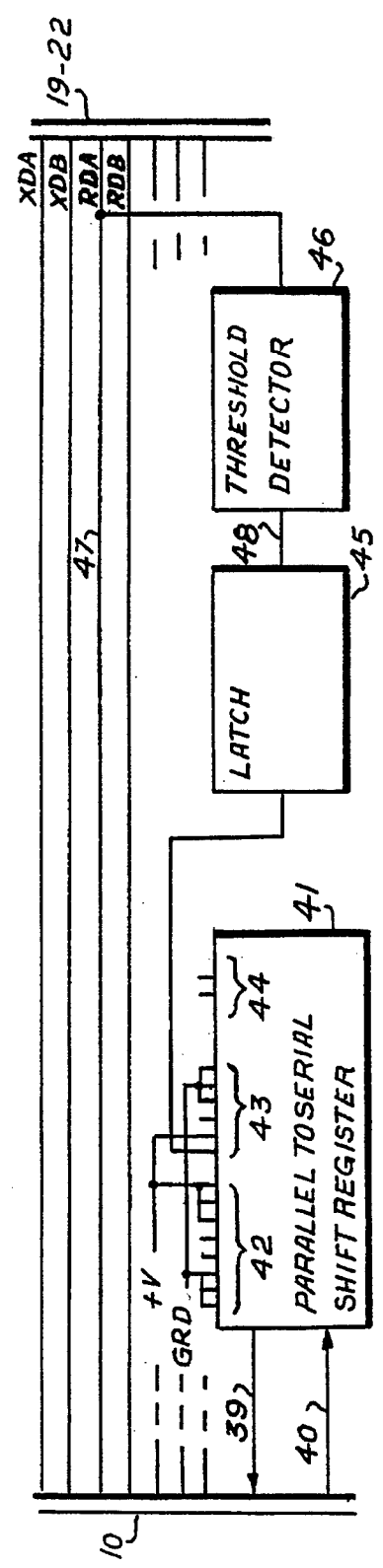
FIG. 3 is a block diagram of an adaptor module.

The block diagram of a typical adaptor module illustrated in FIG. 3 will be used in explaining the automatic identification of the electrical interface standard to which each port conditioner module of FIG. 2 must be programmed. A 16-bit parallel to serial shift register 41 has the first 8 bits 42 of its parallel input hard-wired to indicate the adaptor module identification. The following 6-bit set 43 are loaded by the output of a latch 45 which cooperates with a threshold detector 46 to generate a code indicative of the type of electrical interface standard necessitated by the peripheral module. The remaining set 44 of 2-bits may be used for other purposes or for future expansion. The input of the threshold detector 46 is connected to the receive data line RDA 47, so that its output 48 which controls the latch 45 will vary depending upon whether the data signal received from the peripheral device rises or not above the set threshold voltage of the detector 46. For instance, a preset threshold of 1 volt could be used to discriminate between a V.35 data voltage signal of typically 0.5 volt and a RS-232 data signal of typically 15 volt on the receiver data line 47. The interface standard discriminating scheme is only an example of the various types of circuits that can be devised to load the shift register 41 in accordance with the level or other characteristic of the signals sensed on one or more lines of the connectors 19–22 associated with the peripheral devices. It should also be noted that the 6-bit set 43 could be hard-wired in a particular module dedicated to a particular interface standard configuration. There are also many schemes, other than the shift register, which could be used to generate within each adaptor module a particular signal or other parameter indicative of the type of interface standard which must be utilized, in such a way that this signal or parameter can be remotely acquired. For instance, each adaptor module could be equipped with a fixed or adjustable impedance circuit that could be measured by the micro-processor through one of the cables 11–14 of FIG. 1.

The shift register 41 is driven by the XCL clock signal 39 received from the micro-processor 25 through the gated driver 36 of the port conditioner module 26–29 shown in FIG. 1. The serial bit stream 40 identifying not only the adaptor, but also the type of interface standard needed appears at the output of the shift register and is fed back through to the micro-processor 25 via the gated receiver 37 on the corresponding port conditioner module.

Figure 4:
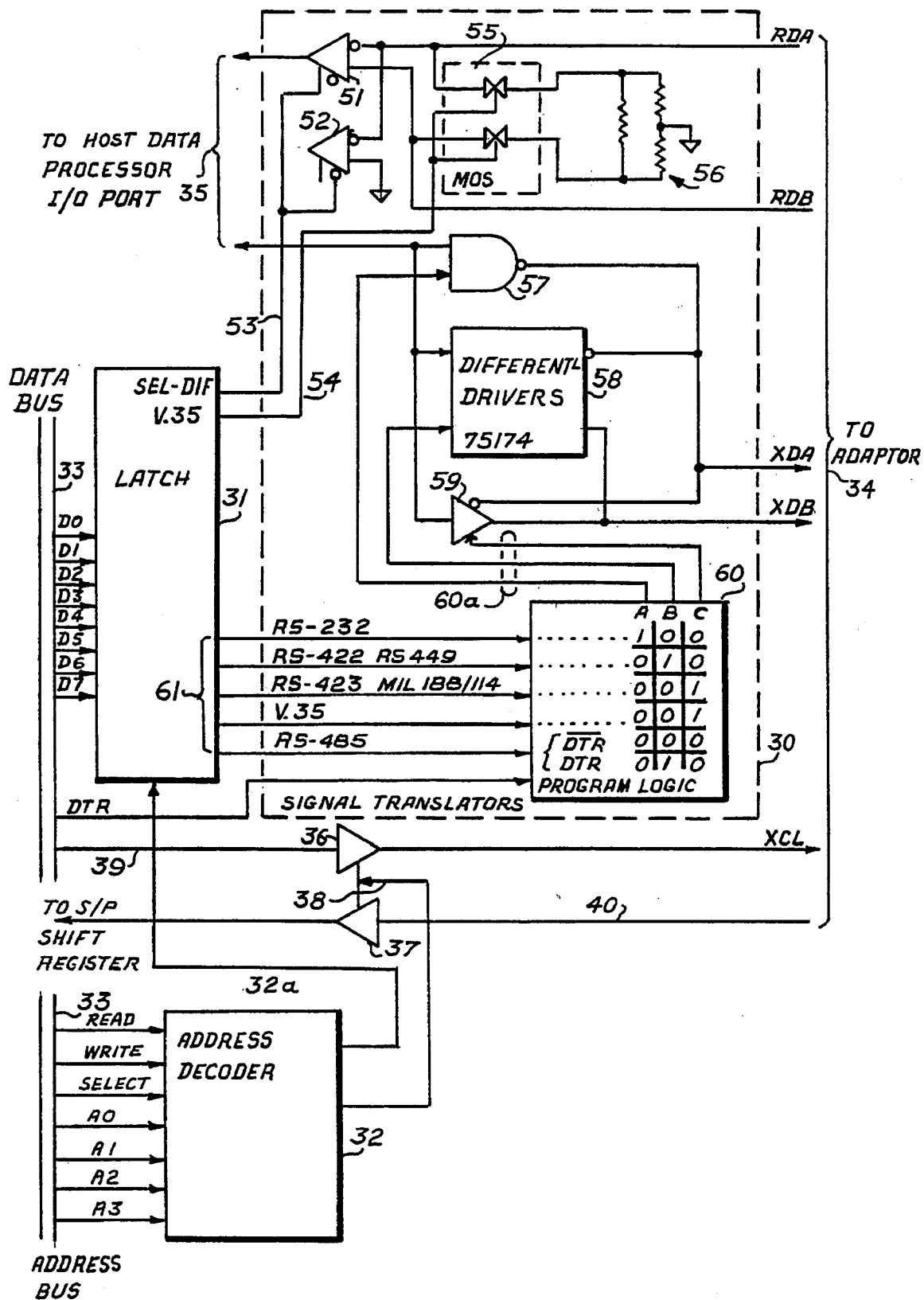
FIG. 4 is a schematic of the port conditioner unit.

The construction of the port conditioner module as shown in FIG. 2 will now be explained with reference to the schematic of FIG. 4. When the micro-processor 25 of FIG. 2 addresses a particular port conditioner module its latch 31 and its gated pair of driver 36 and receiver 37 are enabled by the address decoder 32 via line 38. The clock signal 39 from the micro-processor is then sent to the adaptor module 15–18 of FIG. 1 as a shift signal to the parallel-to-serial shift register 41 shown in FIG. 2. The resulting peripheral unit identification bit stream 40 is then fed serially to a serial-to-parallel shift register 49 on the multiport control module 7 shown in FIG. 2 via the gated receiver 37. The parallel outputs 50 of the shift register are fed to the micro-processor bus 33. The stepping of the two shift registers 41, 49 of FIG. 2 and FIG. 3 respectively by the XCL clock signal 39 can be conveniently interpreted by programming the micro-processor to recognize a particular bit pattern on some or all the parallel output lines 50 of the serial-to-parallel shift register 49. The micro-processor also uses the identification code now stored in the serial-to-parallel shift register 49, to generate a signal translator instruction which is loaded into the latch 31. The data line receivers 51, 52 are then set by the SEL-DIF line 53 to act either as a pair of differential receivers or as a single-ended receiver for the input lines RDA and RDB depending upon whether the SEL-DIF line 53 is set high or low. If the V.35 electrical standard has been selected, the V.35 line 54 activates a pair of MOSFET switches 55 which place a reduced impedance network 56 across the inputs of the data receiver as required by this particular interface standard.

The output data lines XDA and XDB are either programmed as a single-ended unipolar output by means of driver 57, as a differential bipolar output by means of differential drivers 58, or as differential unipolar output by means of driver 59 depending upon the desired electrical standard and as determined by lines 60a out of the translator program logic unit 60 which decodes a set of output lines 61 from the latch 31, according to the examplary truth-table listed in the program logic block 60. For instance, when an RS-232 interface is requested by the raising of the RS-232 line, output A fed to gate 57 is raised while outputs B and C remain low. When RS-485 interface is required, output A and C remain low. Output B rises only if the DTR (Data Terminal Ready) signal on the microprocessor 33 is raised. In this case, the DTR line is used to distinguish between parts of the two-wire half-duplex data characterizing the RS-485 interface, according to a technique well-known to those skilled in the data processing arts. A similar scheme is used to adapt other interface control lines in accordance with the various electrical interface standards. In this preferred embodiment of the invention, the line drivers and receivers can be programmed to accommodate seven of the most common electrical interface standards: RS-232, RS-422, RS-423, RS-449, RS-485, V.35 and MIL-188/114. It should be noted that the tri-stated line drivers and receivers that have just been disclosed have adequate substitutes in equivalent circuits well-known to those skilled in electronic arts such as output level clamping circuits, or the multiplexing of parallel circuits through a set of MOSFET switches.

Figure 5:
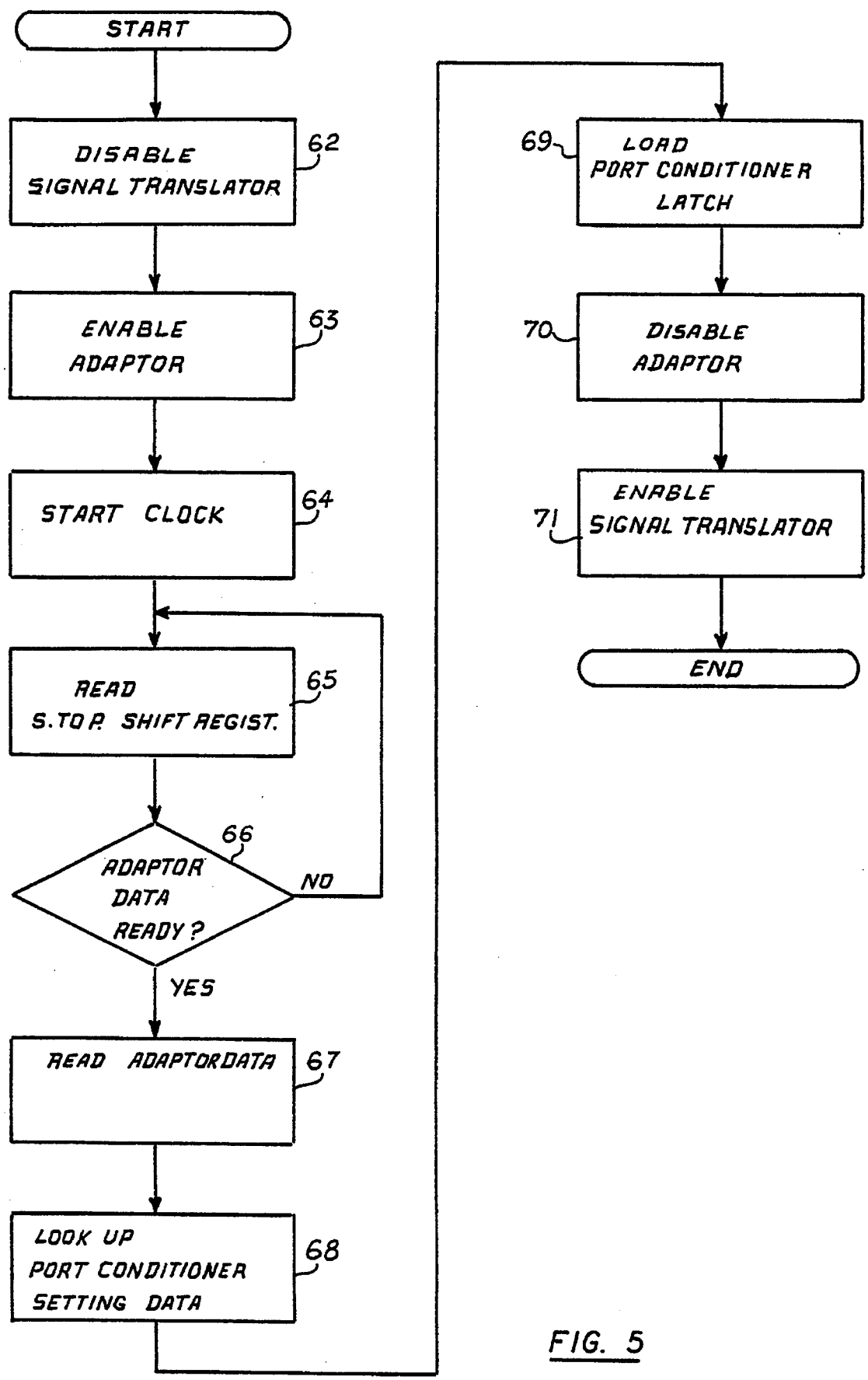
FIG. 5 is a flow diagram of the micro-processor program.

The task of reconfiguring the various input/output ports is accomplished automatically by the micro-processor 25 in accordance with the flow diagram of FIG. 5. This task will now be described with references to FIGS. 1–5.

The process begins by the disabling 62 of the signal translator 30 of each port conditioner 26–29, and the enabling 63 of the adaptor modules 15–18. The clock is started 64 and fed to the serial to parallel shift register 49 and to the parallel to serial shift 41. The content of the serial to parallel shift register 49 is read 65 by the microprocessor to determine 66 whether an identification message has been received from the adapters 15–18. After a recognizable identification message has been read 65, the microprocessor 25 interrogates 68 its look-up table. The resulting programming data is loaded 69 into the latch 31. This data is used by the programming logic 60 to generate the port conditioner setting data 60a. At that point the adaptor circuit can be disabled 70, and the signal translator activated 71. The automatic reconfiguration task is triggered by the powering or resetting of the host data processor 2, on command as requested by the operator or through a separate program. The micro-processor holds in memory a look-up table which provides a set of programming parameters for each type of desired electrical interface standard. Those parameters are the configuration control settings which are loaded into the latch 31 of each port conditioner module via the microprocessor bus 33. The look-up table can conveniently be prepared in accordance with the published parameters of the desired electrical interface standards. Once the port conditioner modules are programmed, the entire multi-interface port system circuitry is completely transparent to the host processor as well as the various peripheral devices, allowing the host data processor to communicate with the diverse peripheral devices under diverse protocols without loss of time or operator intervention. It should be understood that while only four port conditioner modules are provided in the just-described system, that number could be increased without putting an undue burden on the operation of the microprocessor. Each port conditioner module is preferably packaged in an application specific integrated circuit. Each adaptor module can be easily packaged in a small enclosure for which power can be supplied from the multiport control module through the cable 11–14.

While the preferred embodiment of the invention has been described, modifications can be made and other embodiments may be devised without departing from the spirit of the invention and the scope of the appended claims.

What is claimed is:

1. A self-adapting interface assembly connected to i/o port of a host data processor for communicating with a variety of data processing devices, said I/O port including means for presenting a first set of signals generated by said host data processor and for accepting a second set of signals from said data processing devices, said assembly comprising:

a plurality of multi-conductor cables;
   a plurality of adaptor modules, wherein any one adaptor module comprises:
      means for connection to one of said data processing devices;
      means for generating a signal, indicative of a type of device connected to said any one adaptor module, comprising means for transmitting said signal to said multi-port control module over said any one multi-conductor cable;
   a multi-port control module, associated with the host data processor and connected to said plurality of said multi-conductor cables, whereby said any one multi-conductor cable connects said any one adaptor module, comprises:
      a. a first interface connected to said I/O port;
      b. means for requesting said signal over said any one multi-conductor cable;
      c. means for receiving and storing said signal;
      d. means for interpreting said signal;
      e. means, responsive to means for interpreting, for conditioning signals between said any one multi-conductor cable and the first interface including:
         i. first means for translating a plurality of said first set of signals appearing on said I/O port and directed to said one of said data processing devices;
         ii. second means for translating a plurality of said second set of signals received from said one of said data processing devices through said any one adaptor modules via said any one multi-conductor cables for presentation to said I/O port;
         iii. means for simultaneously enabling said first and second means for translating upon a power-on or a reset of the host data processor.

2. The assembly of claim 1, wherein said means for interpreting comprise a programmable micro-processor having a data bus and an address bus; and said means for conditioning signals comprises:

a plurality of programmable drivers each driver having a fixed input signal characteristic and at least two selectable output signal characteristics;
   a plurality of programmable receivers each receiver having at least two selectable input signal characteristics and a fixed output signal characteristic compatible with said input/output port.

3. The assembly of claim 2, wherein said means for interpreting further comprise:

latching means driven by said data bus for holding programming codes for said programmable drivers and receivers; and
   a decoder driven by said address bus for enabling said latching means for holding.

4. The assembly of claim 3, wherein said means for generating comprise:

means for generating a serial coded bit stream; and
   means for transmitting said said bit stream to said multiport control module over said cable; and wherein said means for interpreting comprise means for receiving said coded bit stream.

5. The assembly of claim 4, wherein said means for generating said coded bit stream comprise:

a first shift register having a parallel loading set of terminals and a serial output port; and means for placing a series of coded signals indicative of said type of device on said parallel loading set of terminals.

6. The assembly of claim 5, wherein said means for placing said series of coded signals comprises a set of jumper wires connecting said terminals to fixed voltage level sources.

7. The assembly of claim 5, wherein said means for placing said series of coded signals comprises:

means for detecting at least one signal on said means for connecting; and means, responsive to said means for detecting, for applying one of a plurality of sets of coded signals on said terminals.

8. The assembly of claim 7, wherein said means for receiving said bit stream comprise:

a second shift register having a serial input port and a parallel set of output terminals connectable to said data bus;

means for transferring data from said first shift register into said second shift register; and program means in said microprocessor for reading said data in said second shift register and for generating said programming codes.

9. The assembly of claim 2, wherein said programmable drivers comprise means for alternately generating a single-ended output signal and a differential output signal.

10. The assembly of claim 9, wherein said programmable drivers comprise:

means for alternately generating a unipolar output signal and a bipolar output signal.

11. The assembly of claim 2, wherein said programmable receivers comprise means for alternately receiving a single-ended input signal and a differential input signal.

12. The assembly of claim 10, wherein said programmable drivers comprise means for selectively generating output signals having different voltage amplitudes.

13. The assembly of claim 2, wherein said programmable receivers comprise means for alternately receiving a bipolar input signal and a unipolar input signal.

14. The assembly of claim 2, wherein said programmable receivers comprise means for selectively changing a receiver input impedance.

15. The assembly of claim 7, wherein said means for detecting at least one signal comprise means for identifying a signal having a voltage level in excess of a given threshold.

16. The assembly of claim 3, wherein said means for interpreting further comprise a logic decoding network for translating said programming codes into control signals for said programmable drivers.

* * * * *